(12) United States Patent
Horstemeyer

(10) Patent No.: US 9,726,249 B2
(45) Date of Patent: Aug. 8, 2017

(54) SHOCK MITIGATING MATERIALS AND METHODS UTILIZING SPIRAL SHAPED ELEMENTS

(75) Inventor: Mark F. Horstemeyer, Starkville, MS (US)

(73) Assignee: Mississippi State University, Mississippi State, MS (US)

( * ) Notice: Subject to any disclaimer, the term of this patent is extended or adjusted under 35 U.S.C. 154(b) by 483 days.

(21) Appl. No.: 13/469,172

(22) Filed: May 11, 2012

(65) Prior Publication Data
US 2014/0026279 A1    Jan. 30, 2014

Related U.S. Application Data

(60) Provisional application No. 61/485,847, filed on May 13, 2011.

(51) Int. Cl.
| | |
|---|---|
| F16F 7/00 | (2006.01) |
| A42B 3/06 | (2006.01) |
| A41D 13/015 | (2006.01) |
| A63B 71/10 | (2006.01) |
| F16F 1/10 | (2006.01) |
| F41H 1/00 | (2006.01) |

(Continued)

(52) U.S. Cl.
CPC ............... *F16F 7/00* (2013.01); *A41D 13/015* (2013.01); *A42B 3/065* (2013.01); *F16F 1/025* (2013.01); *F16F 1/10* (2013.01); *F41H 1/00* (2013.01); *F41H 1/02* (2013.01); *F41H 5/02* (2013.01); *A42B 3/06* (2013.01); *A63B 71/10* (2013.01)

(58) Field of Classification Search
CPC ...... A41D 13/00; A41D 13/015–13/018; F16F 1/042; F16F 1/043; A63B 71/10; F41H 1/04; F41H 1/06; F41H 1/08

USPC ............ 428/335–337, 352–360, 222, 295.7, 428/298.4, 362, 369–371, 906, 591, 592; 442/295.7, 298.4, 369–400, 906; 2/455–25, 205, 410–9; 89/36.05; 267/166–180; D29/102–107

See application file for complete search history.

(56) References Cited

U.S. PATENT DOCUMENTS 4,111,407 A * 9/1978 Stager ................ F16F 1/08
                                                 267/166
4,292,702 A * 10/1981 Phillips ..................... 5/683
(Continued)

OTHER PUBLICATIONS

National Wildlife Foundation, Bighorn Sheep, accessed Sep. 10, 2014, http://www.nwf.org/wildlife/wildlife-library/mammals/big-horn-sheep.aspx.*

(Continued)

Primary Examiner — Frank Vineis
(74) Attorney, Agent, or Firm — Lawrence Arthur Schemmel

(57) ABSTRACT

Various embodiments of a spiral shaped element and embedded wavy materials are disclosed for use in a shock mitigating material to dissipate the energy associated with the impact of an object. The shock mitigating material can be used in helmets, bumpers, bullet proof vests, military armor, and other applications. One embodiment, among others, is a shock mitigating material having a plurality of spiral shaped elements, each having a circular cross section, and each being tapered from a large outside end to a small inside end but also having an embedded wavy material that can induce shear waves to mitigate the shock pressure and impulse.

22 Claims, 14 Drawing Sheets

(51) Int. Cl.
F41H 1/02 (2006.01)
F41H 5/02 (2006.01)
F16F 1/02 (2006.01)
F16F 1/00 (2006.01)

(56) References Cited

U.S. PATENT DOCUMENTS

| | | | |
|---|---|---|---|
| 6,276,255 B1* | 8/2001 | Field et al. | 89/36.05 |
| 6,378,140 B1* | 4/2002 | Abraham | A42B 3/064 |
| | | | 2/411 |
| 2011/0227353 A1* | 9/2011 | Nagwanshi et al. | 293/137 |

OTHER PUBLICATIONS

Merck, Ears, accessed Sep. 10, 2014, http://www.merckmanuals.com/home/ear_nose_and_throat_disorders/biology_of_the_ears_nose_and_throat/ears.html.*
Bioon, Auditory and Vestibular Pathways, http://www.bioon.com/bioline/neurosci/course/audvest.html, accessed Jul. 7, 2015.*
Roymech, Helical Spring Design, archived Feb. 22, 2007, http://www.roymech.co.uk/Useful_Tables/Springs/Springs_helical.html#Rectangular.*
"Vibration", Dictionary.com, accessed Feb. 24, 2016, http://dictionary.reference.com/browse/vibration.*
"NASA", "Numerical Simulation of Flow Past a Tapered Cylinder," AIAA Paper 91-0751, 1991.*
Bartoli, Ivan, et al., "Modeling Wave Propagation in Damped Waveguides of Arbitrary Cross-Section", Journal of Sound and Vibration, 295 (2006) pp. 685-707.
Treyssede, Fabien, "Elastic Waves in Helical Waveguides", Wave Motion 45 (2008), pp. 457-470.
Snively, Eric, et al., "Common Functional Correlates of Head-Strike Vehavior in the Pachycephalosaur Stegorceras validum (Ornithischia, Dinosauria) and Combative Artiodactyls", PLos One, vol. 6, Issue 6, Jun. 2011, pp. 1-26.
Setchell, Robert E., et al., "An Investigation of Shock Strengthening in a Conical Convergent Channel", J. Fluid Mech. (1972), vol. 56, part 3, pp. 505-522.
Munch, E., et al., Tough, Bio-Inspired Hybrid materials, Science, vol. 322, Dec. 5, 2008, pp. 1516-1520.
Yoon, Sang-Hee, et al., "A Mechanical Analysis of Woodpecker Drumming and It's Application to Chock-Absorbing Systems", Bioinspiration & Biomimetrics, vol. 6, (2011), pp. 1-12.
Ressl, Marc. S., et al. "Design of an Acoustic Anechoic Chamber for Application in Hearing Aid Research", Recent Advances in Acoustics & Music, Proceedings of the 11th WSEAS International Conference on Acoustics & Music: Theory & Applications (AMTA '10), Jun. 2010.
Willinger, Remy, et al. "Three-Dimensional Human Head Finite-Element Model Validation Against Two Experimental Impacts", Annals of Biomedical Engineering, vol. 27, pp. 403-410, 1999.
Oda, Juhachi, et al., "Mechanical Evaluation of the Skeletal Structure and Tissue of the Woodpecker and It's Shock Absorbing System", JSME International Journal, Series A, vol. 49, No. 3, 2006, pp. 390-396.
Mohammed, Javeed Shaikh, et al., "Bioinspired Design of Dynamic Materials", Adv. Mater. 2009, 21, pp. 2361-2374.
Maity, Parimal, et al., "Finite Element of Ramming in Ovis Canadensis", Journal of Biomechanical Engineering, vol. 133, Feb. 2011, pp. 021009-1 to 021009-9.
Mace, Brian R., et al., "Finite Element Prediction of Wave Motion in Structural Waveguides", J. Acoust. Soc. Am., vol. 117, No. 5, May 2005, pp. 2836-2842.
Hayashi, Takahiro, et al., "Guided Wave Dispersion Curves for a Bar with an Arbitrary Cross-Section, a Rod and Rail Example", Ultrasonics, vol. 41, 2003, pp. 175-183.
Bond, C., "Shock Focusing in a Planar Convergent Geometry: Experiment and Simulation", J. Fluid Mech (2009), vol. 641, pp. 297-333.
Gavric, L. "Computation of propagative Waves in Free Rail Using a Finite Element Technique", Journal of Sound and Vibration, (1995), vol. 185(3), pp. 531-543.
Demma, A., "The Effect of Bends on the Propagation of Guided Waves in Pipes", Transactions of the ASME, vol. 127, Aug. 2005, pp. 328-335.
Shergold, Oliver A., et al., "The Uniaxial Stress Versus Strain Response of Pig Skin and Silicone Rubber at Low and High Strain Rates", International Journal of Impact Engineering, vol. 32, pp. 1384-1402, 2006.
Farke, Andrew A., "Frontal Sinuses and Head-Butting in Goats: A finite Element Analysis", The Journal of Experimental Biology, vol. 211, pp. 3085-3094, 2008.
Trim, Michael W., "The Effects of Water and Microstructure on the Mechanical Properties of Bighorn Sheep (*Ovis canadensis*) Horn Keratin", Acta Biomaterialia. vol. 7, pp. 1228-1240, 2011.
Chafi, M.S., et al., "Biomechanical Assessment of Brain Dynamic Responses Due to Blast Pressure Waves", Annals of biomedical Engineering, vol. 38, No. 2, Feb. 2010, pp. 490-504.
Tombolato, Luca, et al., "Microstructure, Elastic Properties and Deformation mechanisms of Horn Keratin", Acta Biomaterialia, vol. 6, pp. 319-330, 2010.
Frikha, Ahmed, et al., "Effect of Axial Load on the Propagation of Elastic Waves in Helical Beams", Wave Motion, vol. 48, pp. 83-92, 2011.
Bright, Jen A., "Sensitivity and Ex Vivo Validation of Finite Element Models of the Domestic Pig Cranium", Journal of Anatomy, vol. 219, pp. 456-471, 2010.
Hogg, D.A., "The Development of Pneumatisation in the Postcranial Skeleton of the Domestic Fowl", Journal of Anatomy, vol. 139, pp. 105-113, 1984.

* cited by examiner

US 9,726,249 B2

SHOCK MITIGATING MATERIALS AND METHODS UTILIZING SPIRAL SHAPED ELEMENTS

CROSS-REFERENCE TO RELATED APPLICATION

This application claims priority to U.S. provisional application entitled, "Shock Mitigating Materials and Methods Utilizing Spiral Shaped Elements," having Ser. No. 61/485,847, filed May 13, 2011, which is entirely incorporated herein by reference.

FIELD OF INVENTION

The present invention generally relates to shock mitigating materials, and more particularly, to materials that can be used in helmets, bumpers, bullet proof vests, military armor, and other applications to dissipate energy associated with an object impact.

BACKGROUND OF THE INVENTION

American football can be a very dangerous sport for its players. Players continue to get bigger and stronger, and the speed of play continues to increase. Players commonly suffer injuries. In fact, currently, the average career of a player in the National Football League (NFL) is just over 4 years. Furthermore, head injuries are common. Current helmet designs are not adequately protecting the players. There is a need for improved football helmet designs that better protect players. However, not only related to sporting events like football or even baseball or hockey, impact to induce brain injuries can occur from motorcycle, bicycle, car crashes, and military strikes.

SUMMARY OF THE INVENTION

The present invention provides various embodiments of a spiral shaped element and cyclically designed waves in structures that can be used in shock mitigating material to dissipate the energy associated with the impact of an object, so that energy moving in the direction or transverse to the direction or any angle in between of the object impact is attenuated. The shock mitigating material can be used in helmets, bumpers, bullet proof vests, military armor, and many other applications.

One embodiment of the present invention, among others, can be conceptualized as a shock mitigating material having one or more spiral shaped elements contained therein, each having a circular, rectangular, triangular, or any combination of these as a cross section, and each being tapered from a large outside end to a small inside end, or vice versa as shown in FIG. 1a. Another aspect is shown in FIG. 1b where the shock wave can be mitigated or attenuated by the design of wave gaps in the material.

Another embodiment of the present invention, among others, can be conceptualized as a method as follows: providing a material having one or more spiral shaped elements capable of vibration when impacted; and permitting the material to be impacted by an object so that the elements vibrate and dissipate impact energy. Another way to conceptualize the method is to have one or more wavy gaps or materials imbedded within a structure so when the structure is impacted the wavy material or gap will induce a mechanism in shear to dissipate the impact energy.

Other embodiments, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the geometric effects of the present invention. Moreover, in the drawings, like reference numerals designate corresponding parts throughout the several views.

FIG. 2 is a graph of ramped, pressure load history applied to a fixed end of each of the models of FIG. 1a.

FIGS. 3(a) and 3(b) show displacement (a) contour and (b) wave propagation plots, respectively, of each of the models of FIG. 1a.

FIGS. 4(a) and 4(b) show pressure (a) contour and (b) wave propagation plots, respectively, of each of the models of FIG. 1a.

FIGS. 5(a) and 5(b) show Von Mises stress (a) contour and (b) wave propagation plots, respectively, of each of the models of FIG. 1a.

DETAILED DESCRIPTION OF THE PREFERRED EMBODIMENTS

Figure 1A:
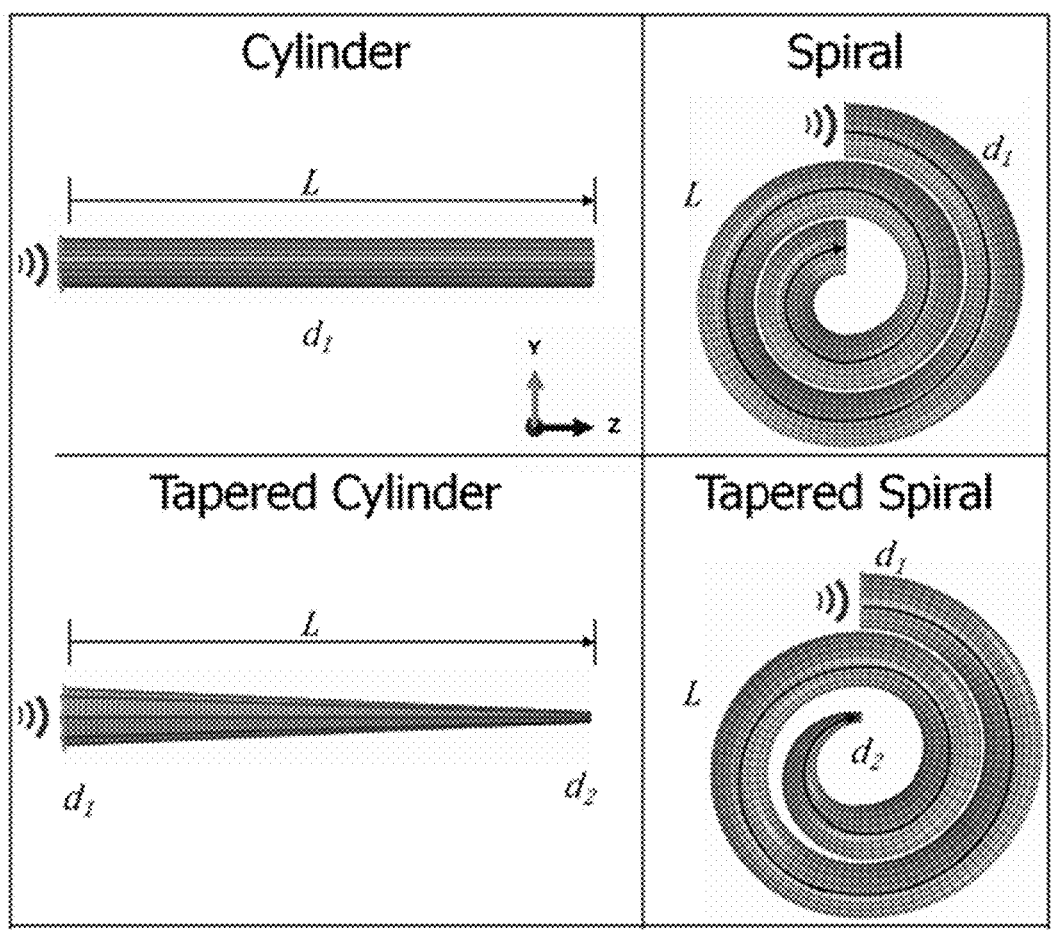
FIG. 1 (a) is a schematic representation of the four finite element models used in the analysis to demonstrate the energy dissipating properties of spiral shaped elements.
FIG. 1(b) shows a wavy gap or material embedded within a structure in which the finite element model illustrates the wave dispersion effects from the wavy gap or material(s).

The physics of stress waves, and all other wave types, are governed by three fundamental, conservation laws: conservation of mass, momentum, and energy. Neglecting surface waves, there are two main types of waves that propagate through elastic, isotropic solids: longitudinal waves and shear waves. Longitudinal (also called dilatational, pressure, primary, or P-) waves propagate with a characteristic wave speed and represent a volumetric change. Their motion is parallel to the direction of propagation of the wave. Shear (also called secondary, S-, or distortional) waves represent no volume change, and propagate at a slower wave speed with respect to longitudinal waves. Their motion is normal to the direction of propagation. See, for example, Davis J L. Wave Propagation in *Solids and Fluids*. New York, N.Y.: Spring-Verlag Inc., 1988; Zukas J A, Nicholas T, Swift H F, Greszczuk L B, Curran D R, *Impact Dynamics*. Malabar, F L: Krieger Publishing Co., 1992; and Achenbach J D. *Wave propagation in elastic solids*: North-Holland, 1993, all of the foregoing publications of which are incorporated herein by reference in their entirety.

When either a longitudinal or shear wave impinges on a boundary, new waves are generated due to the reflective nature of waves. In a body with finite dimensions, these waves bounce back and forth between the bounding surfaces and interact with one another. These interactions can lead to wave amplification, cancellation, and other wave distortions. In the invention described here, both the spiral geometry and wavy embedded structure introduce deleterious shear waves that disperse, attenuate, and dissipate the input pressure.

When the cross-sectional area of a cylindrical bar is reduced, a geometric impedance difference arises despite the intrinsic impedance of the material remaining unaltered.

When a compressive elastic wave produced by a dynamic load or impact reaches the free end of the bar, it reflects back from that surface as a tensile wave. This reflected tensile wave can have detrimental effects on the medium through which it travels.

Impulse is defined as the integral of a force with respect to time. The impulse is equal to the change in momentum of the body. It is possible for a very brief force to produce a larger impulse than a force acting over a much larger time period if that force is sufficiently large. Therefore, it is important to consider these transient forces. A fast-acting force can often be more detrimental to a structure than one that is more dispersed with respect to time.

To reiterate, geometry plays a critical role in the response of a structure to a dynamic load. The four spiral geometries included in this disclosure comprise a cylindrical bar, a tapered cylindrical bar, a spiral with a cylindrical cross-section, and a tapered spiral with a cylindrical cross-section. The cylindrical bar serves as a 'base-line' case. By comparing the response of the tapered cylinder to that of the uniform cylinder, we gain insight into how reducing the cross-sectional area influences the transient response of the structure. Similarly, comparison of the spiral geometry to the uniform cylinder leads to an understanding of the effects of increasing curvature on the wave propagation. Finally, analysis of the tapered spiral allows us to understand the coupled influence of increasing curvature and decreasing cross-sectional area on wave propagation and reflection.

The embedded wavy material is a also a geometric effect that plays a critical role in structures under dynamic loads. The embedded wavy material or gap is compared to a baseline embedded straight line showing the much greater dissipation by way of lower pressures and lower impulses.

With the exception of the simple cylinder, obtaining exact solutions for these geometries is unpractical, if not impossible. Furthermore, the main goal of this analysis was to provide more of a qualitative understanding of how the transients are affected by only geometric differences. For these reasons, a purely computational approach employing the finite element (FE) method has been chosen to study the wave propagation and reflection characteristics of these bodies. The FE method is the most efficient technique to perform these types of studies and has become a widely accepted analysis tool. See, for example, Demma A, Cawley P, Lowe M, Pavlakovic B., *The effect of bends on the propagation of guided waves in pipes*. Journal of Pressure Vessel Technology, Transactions of the ASME 2005; 127: 328; Gavric L., *Computation of Propagative Waves in Free Rail Using a Finite Element Technique*. Journal of Sound and Vibration 1995; 185:531; Treyssède F. *Elastic Waves in Helical Waveguides*. Wave Motion 2008; 45:457; Mace B R, Duhamel D, Brennan M J, Hinke L. *Finite Element Prediction of Wave Motion in Structural Waveguides*, Journal of the Acoustical Society of America 2005; 117:2835; and *ABAQUS v6.10 User Documentation*. Providence, R.I.: Dassault Systemes Simulia Corp., 2010, all of the foregoing of which are incorporated herein by reference.

1. Methodology

FIG. 1a depicts the four geometries that were studied along with the load and boundary conditions that were prescribed. The length and cross-sectional dimensions of each model were kept consistent. The actual dimensions used in the finite element analysis are provided in Table 1, set forth hereafter. The ratio of total length to cross-sectional diameter was also maintained among the four geometries, i.e. $L/d_1=10$. The ratio of the large and small-end diameters was also consistent; $d_1/d_2=2$ for the tapered geometries.

TABLE 1

Actual dimensions of each geometry used in finite element analysis.

| Geometry | Total Length, L ($\times 10^{-1}$ m) | Fixed-end Diameter, $d_1$ ($\times 10^{-2}$ m) | Free-end Diameter, $d_2$ ($\times 10^{-2}$ m) | Fixed-end Area, $A_1$ ($\times 10^{-3}$ m$^2$) | Free-end Area, $A_2$ ($\times 10^{-3}$ m$^2$) |
|---|---|---|---|---|---|
| Cylinder | 7.04 | 7.04 | 7.04 | 3.89 | 3.89 |
| Tapered Cylinder | 7.04 | 7.04 | 3.52 | 3.89 | 0.97 |
| Spiral | 7.04 | 7.04 | 7.04 | 3.89 | 3.89 |
| Tapered Spiral | 7.04 | 7.04 | 3.52 | 3.89 | 0.97 |

Figure 2:
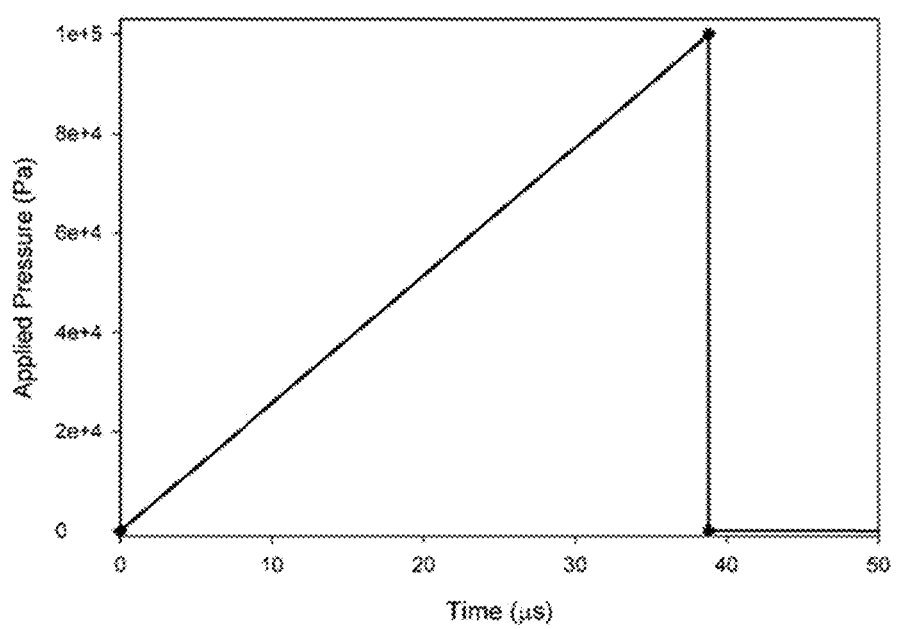

The finite element program ABAQUS/Explicit v6.10 [10] was used as the numerical model in this study for all simulations. It is anticipated that any finite element code would give similar results to all of the solutions generated here. Linear elastic material properties typical of steel were used; i.e. mass density, Poisson's ratio, v=0.3, and Young's modulus, E=207 GPa. All geometries were meshed with 3-dimensional, 8-noded, continuum, linear, brick elements with reduced integration and hourglass control (C3D8R). A ramped, compressive, pressure pulse was applied to the end of each bar. The peak amplitude and duration were set as $1 \times 10^5$ Pa and 38.8 µs, respectively. The prescribed load history is shown in FIG. 2. The nodes along the outer perimeter of the load-end were pinned ($u_1=u_2=u_3=0$) for each case. No additional constraints were prescribed. The resulting stress wave was allowed to propagate through the structure for 800 μs prior to terminating the calculation.

Post-processing of data was performed using ABAQUS/CAE v6.10 [10]. Wave propagation plots were generated by defining a path through each model that extended from the cross-sectional center of the fixed end to the cross-sectional center of the free end. Pressure and displacement response histories at the free-ends were generated by averaging the respective output of each node lying on the cross-section of the free end.

Figure 1B:
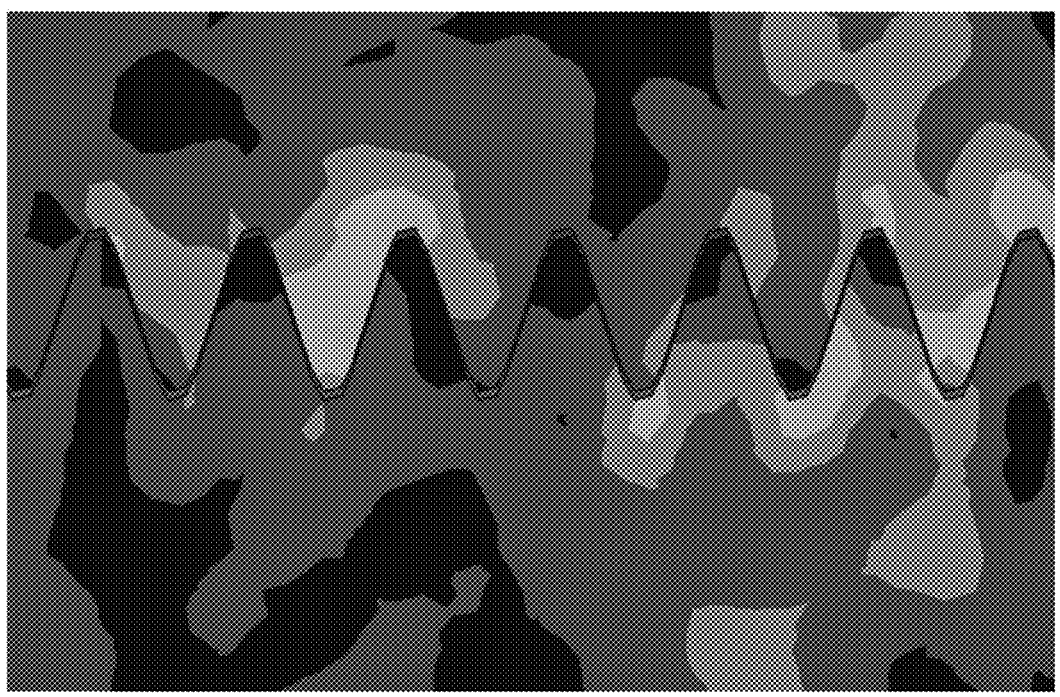

FIG. 1b shows the wave dispersion of the pressure once a wave was initiated at the left end of the block. There is a gap between the upper and lower material the gap being in a wave form.

2. Results

The speed at which a longitudinal, elastic wave travels through a cylindrical, isotropic bar is given by $c_L=\sqrt{E/\rho}$, where E and ρ are the Young's modulus and mass density, respectively. Similarly, an elastic, shear wave travels through the same media at a speed given by $c_S=\sqrt{G/\rho}$ where the shear modulus, $$G = \frac{E}{2(1-v)}.$$

Substitution of the typical steel values given above yields $c_L=5.152\times10^3$ m/s and $c_S=3.196\times10^3$ m/s.

Figure 3A:
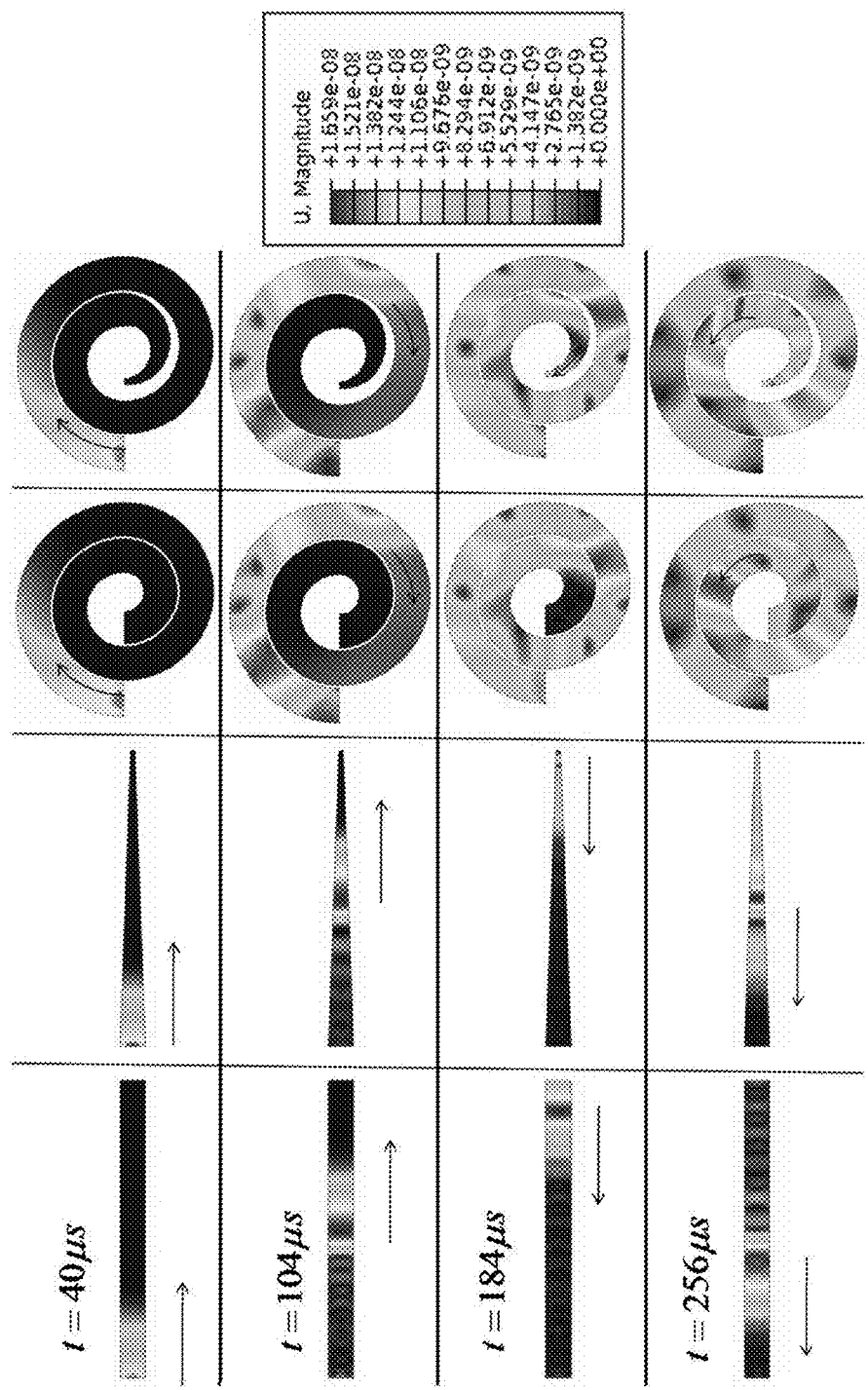
Figure 3B:
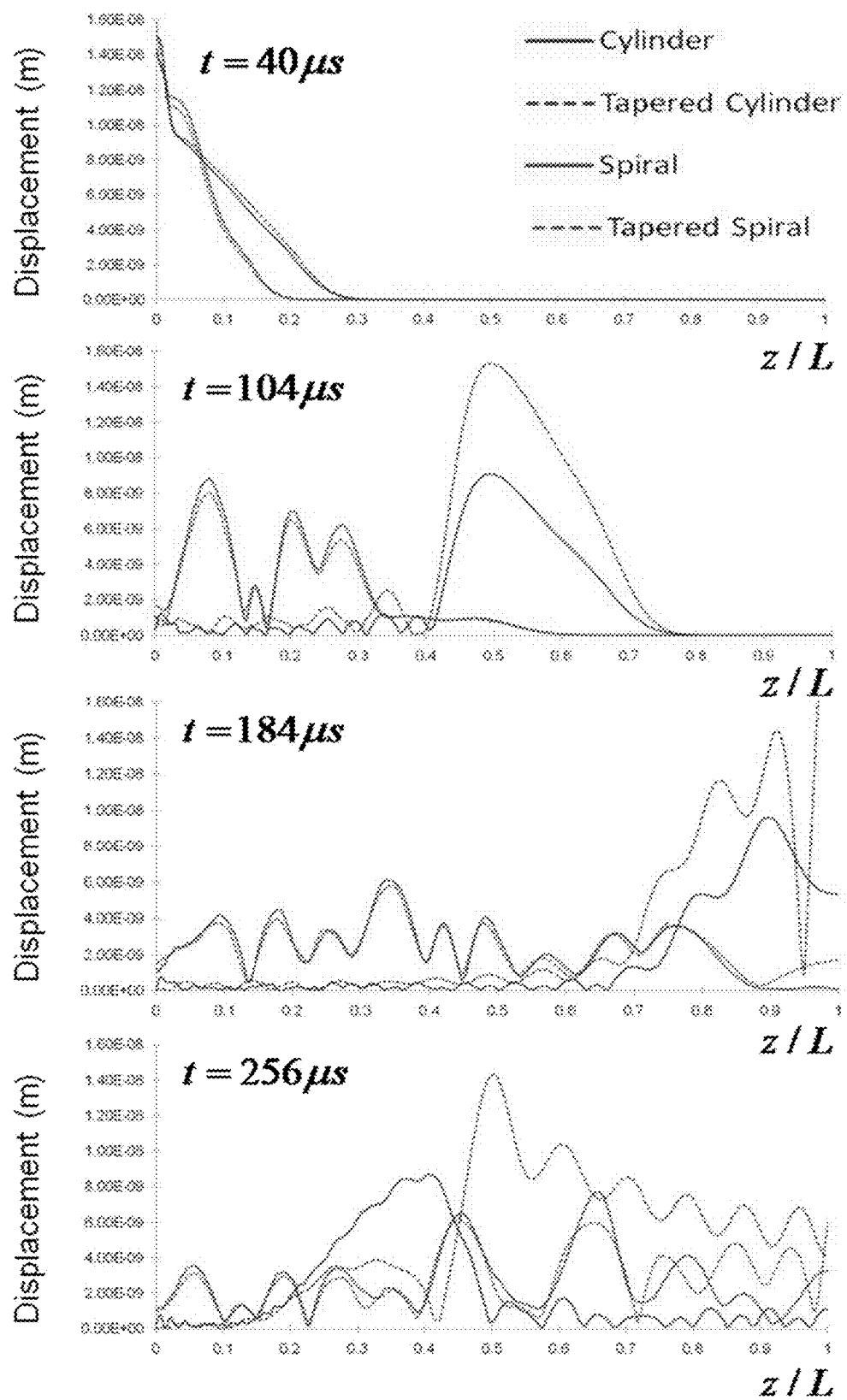

Displacement contour and wave propagation plots for the cylinder, tapered cylinder, spiral, and tapered spiral are shown in FIG. 3. The plots for t=40 μs show the initial wave immediately after the pressure load is released. At t=104 μs, the wave is traveling in the +Z direction. The wave reaches the free end of the tapered cylinder at t=184 μs. At t=256 μs, the reflected wave, is traveling in the −Z direction on its way back to the fixed end. And at t=328 μs, the wave peak reaches the fixed end of the cylinder where it had originated. Similar plots for pressure and the von Mises stress invariants are provided in FIG. 4 and FIG. 5, respectively.

Figure 6:
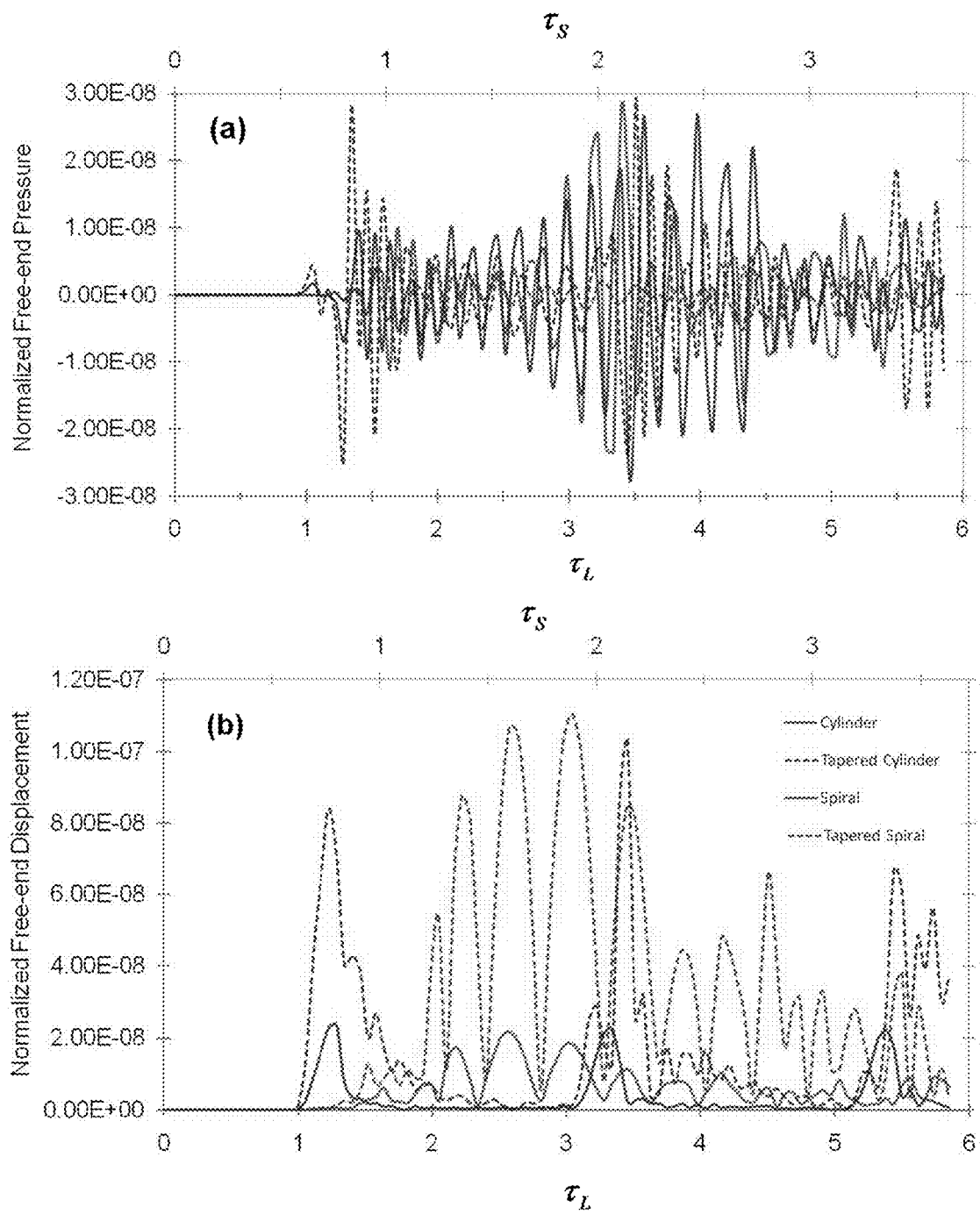
FIGS. 6(a) and 6(b) show normalized free-end (a) pressure and (b) displacement response, respectively, of a cylinder, tapered cylinder, spiral, and tapered spiral. The lower abscissa specifies the time at which the longitudinal wave first reaches the free end. The reflected longitudinal wave arrives back at the fixed end at and so on. Similarly, on the upper abscissa, corresponds to the time at which the shear wave reaches the free end.

FIG. 6(a) shows the pressure response at the free end of the cylinder, tapered cylinder, spiral, and tapered spiral. The free-end displacement response for the four geometries is shown in FIG. 6(b). On the lower abscissa, $\tau_L=t\cdot(c_L/L)=1$ is the time at which the longitudinal wave first reaches the free end. The first and second reflected longitudinal wave arrive back at the free end at $\tau_L=3$ and $\tau_L=5$, respectively. Similarly, on the upper abscissa, $\tau_S=t\cdot(c_S/L)=1$ corresponds to the time at which the shear wave reaches the free end and $\tau_S=3$ represents the arrival of the reflected wave back to the free end.

Figure 7:
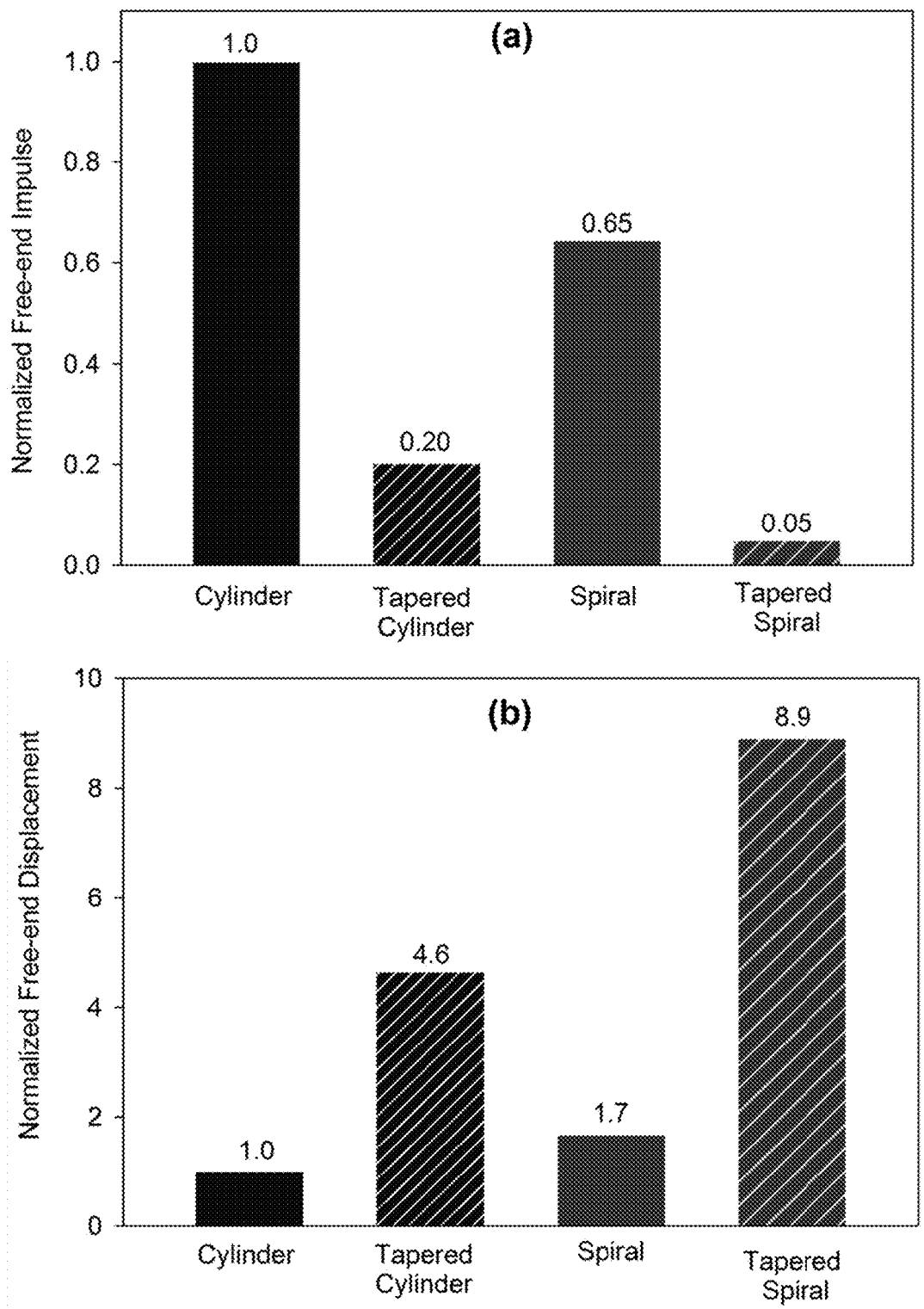
FIGS. 7(a) and 7(b) show normalized (a) impulse and (b) displacement, respectively, at the free end of each model of FIGS. 6(a) and 6(b). Impulse is found by multiplication of the free-end pressure history by the respective free-end area of each geometry followed by integration of the resulting force history (where negative values are neglected). Free-end displacement is taken as the area under the free-end displacement history curve. The free-end impulse and displacement values of the cylinder are used to normalize the results.

FIG. 7(a) compares the normalized impulse at the free end. The impulse is calculated by multiplication of the free-end pressure history by the respective free-end area followed by integration of the resulting force history (where negative values are neglected). FIG. 7(b) is a comparison of the normalized free-end displacement. Free-end displacement is taken as the area under the free-end displacement history curve. The free-end impulse and displacement values of the cylinder are used to normalize the results and provide simple comparison.

Figure 8:
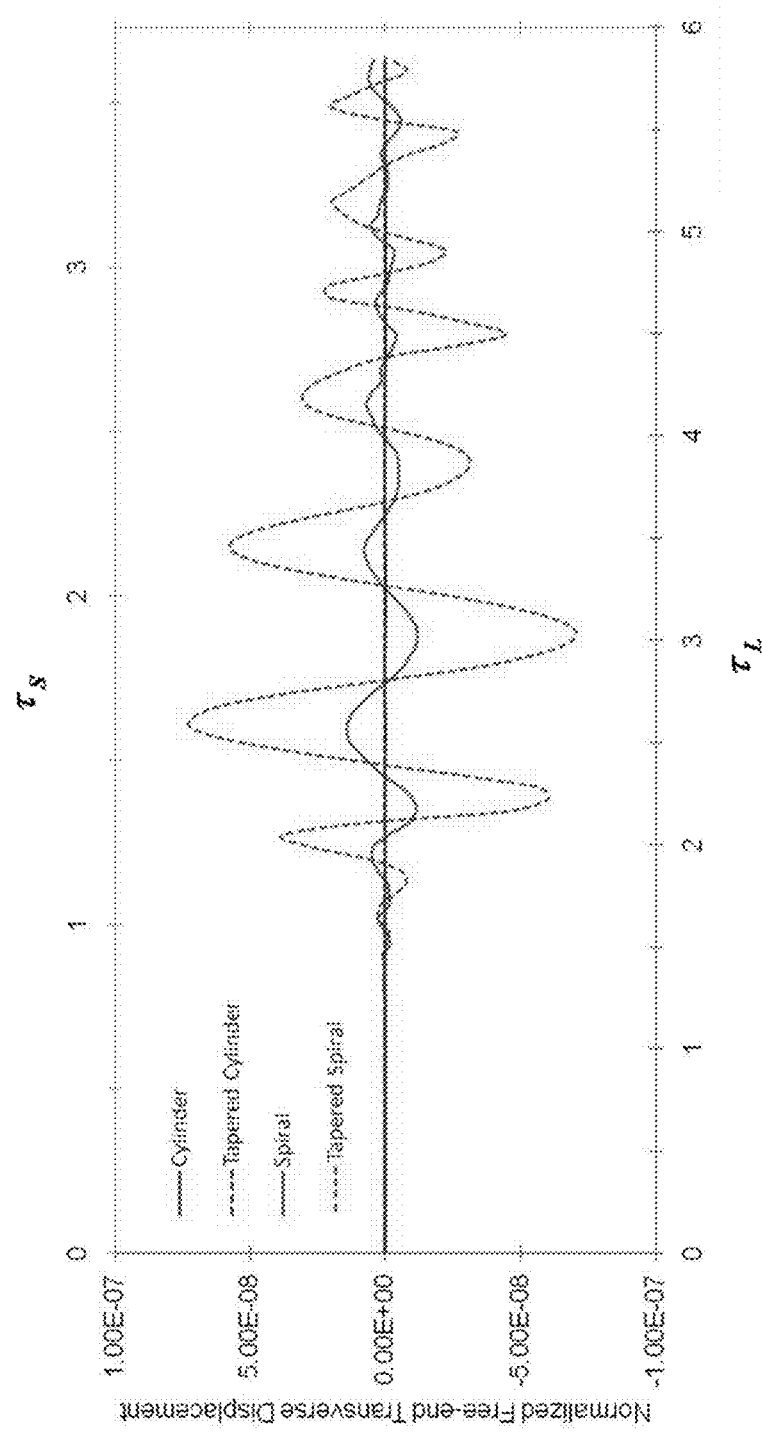
FIG. 8 is a graph showing a normalized free-end transverse displacement response for the models of FIGS. 6(a) and 6(b).

FIG. 8 shows the transverse displacement response.

Figure 9:
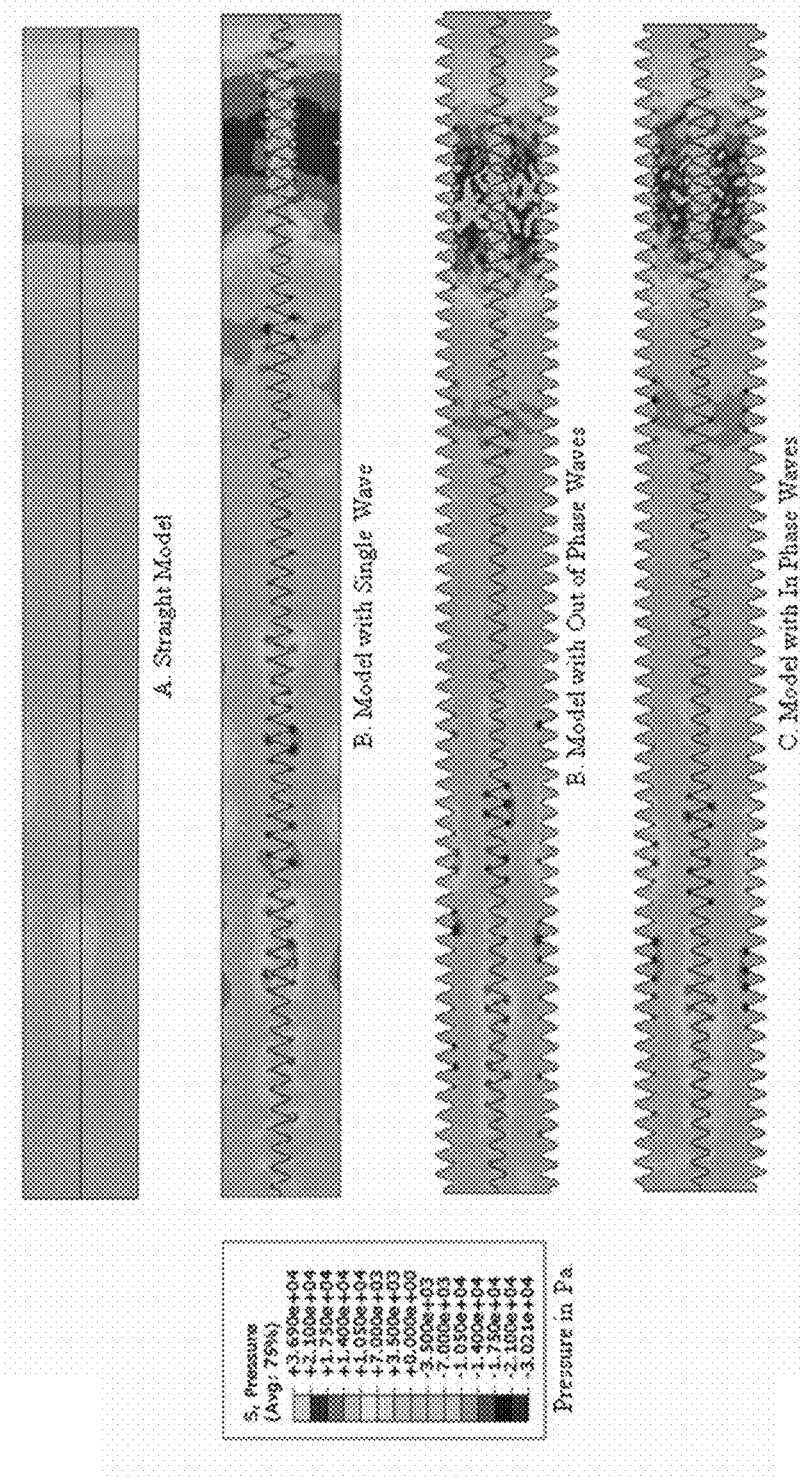
FIG. 9 shows finite element simulation results of the pressure wave as it traversed down different blocks of material with the (a) straight line, (b) single wave embedded in the block of material with a straight edge, (c) single wave embedded in a block of material with an out-of-phase wavy structure, and (d) single wave embedded in a block of material with an in-phase wavy structure.

FIG. 9 shows the different scenarios of the embedded material or gaps within the block of material representing a simple structure. It is anticipated that any structural geometry with the embedded wavy material or gap would generate similar results. The different colors illustrate the effect of the reflections of the various boundaries along with the embedded wavy material or gap.

Figure 10:
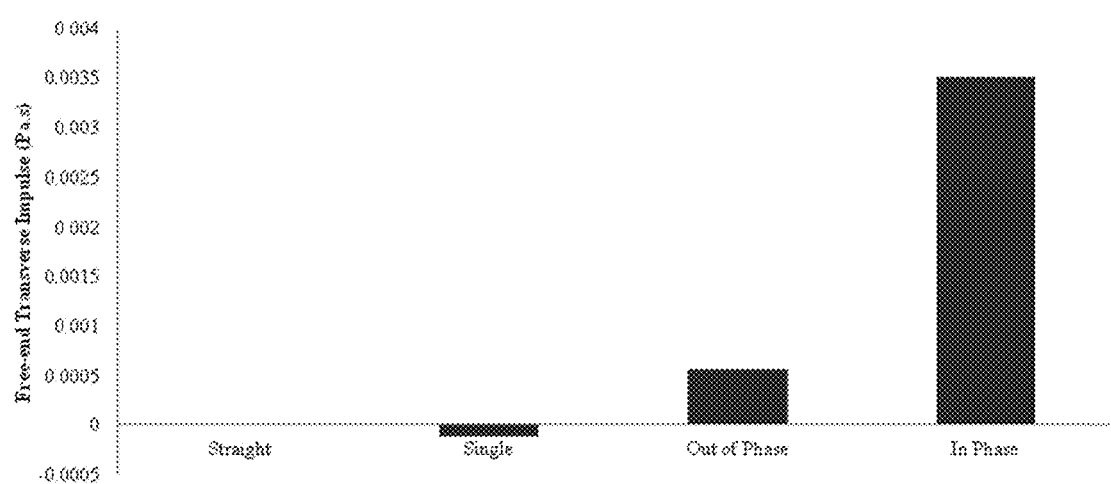
FIG. 10 shows the free-end transverse Impulse from the different wave configurations embedded within the material.

FIG. 10 shows the dramatic drop in the impulse from when the embedded wave was introduced with a single wave, a single wave with an out-of-phase wavy boundary, and a single wave with an in-phase wavy boundary. Clearly, the interactions of the embedded wavy geometries reduces dramatically the impulses (integrated pressure-time histories) much more than the straight line baseline case.

3. Analysis and Discussion

From FIG. 3, we see that at t=40 μs, the wave front is at z/L=0.3 for the cylinder and tapered cylinder. Comparing that to the position of the wave at t=104 μs, we see that prior to any reflection from the free end, the wave travels through the cylinder and tapered cylinder at approximately the same velocity. However, the displacement amplitude is magnified by the reduction in area of the tapered cylinder. The displacement wave reaches the free end of the tapered cylinder at t=184 μs. At this same time, the wave has already reflected from the free end of the uniform cylinder and is traveling in the −Z direction.

In the two spiral geometries, there is a slight bump in the displacement at t=104 μs and z/L=0.5. But, the main displacement wave in the spiral geometries lags behind the main wave in the cylinders. Also, in the spirals, there are more wave interactions as the waves reflect off of the surfaces, which cause the waves to be more dispersed.

The displacement wave reaches the free end of the tapered cylinder first, at t=184 μs. At t=256 μs, the cylinder leads the tapered cylinder. The reflected wave in the tapered cylinder travels slower.

The shear wave travels slower than the longitudinal wave. Therefore, when the waves arrive at the boundary at different times, this leads to dispersion and/or cancellation and lower impulse near the free end of the rods. For the spirals t=184 μs is an interesting time because the longitudinal wave has reached the free end but the shear wave has not.

Figure 4:
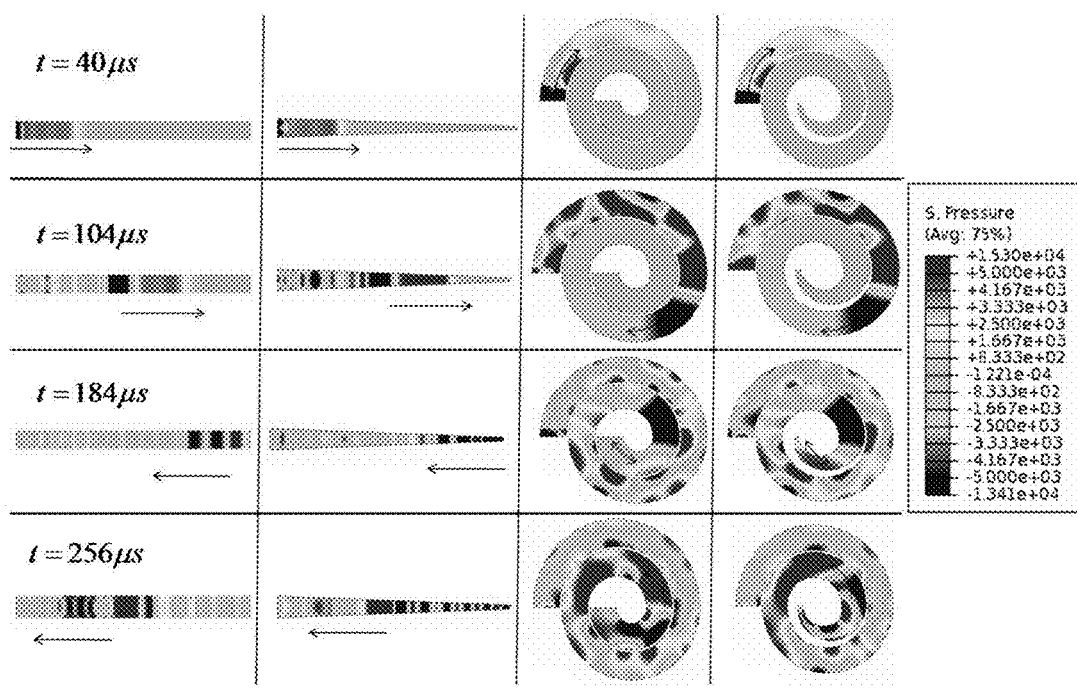
Figure 4B:
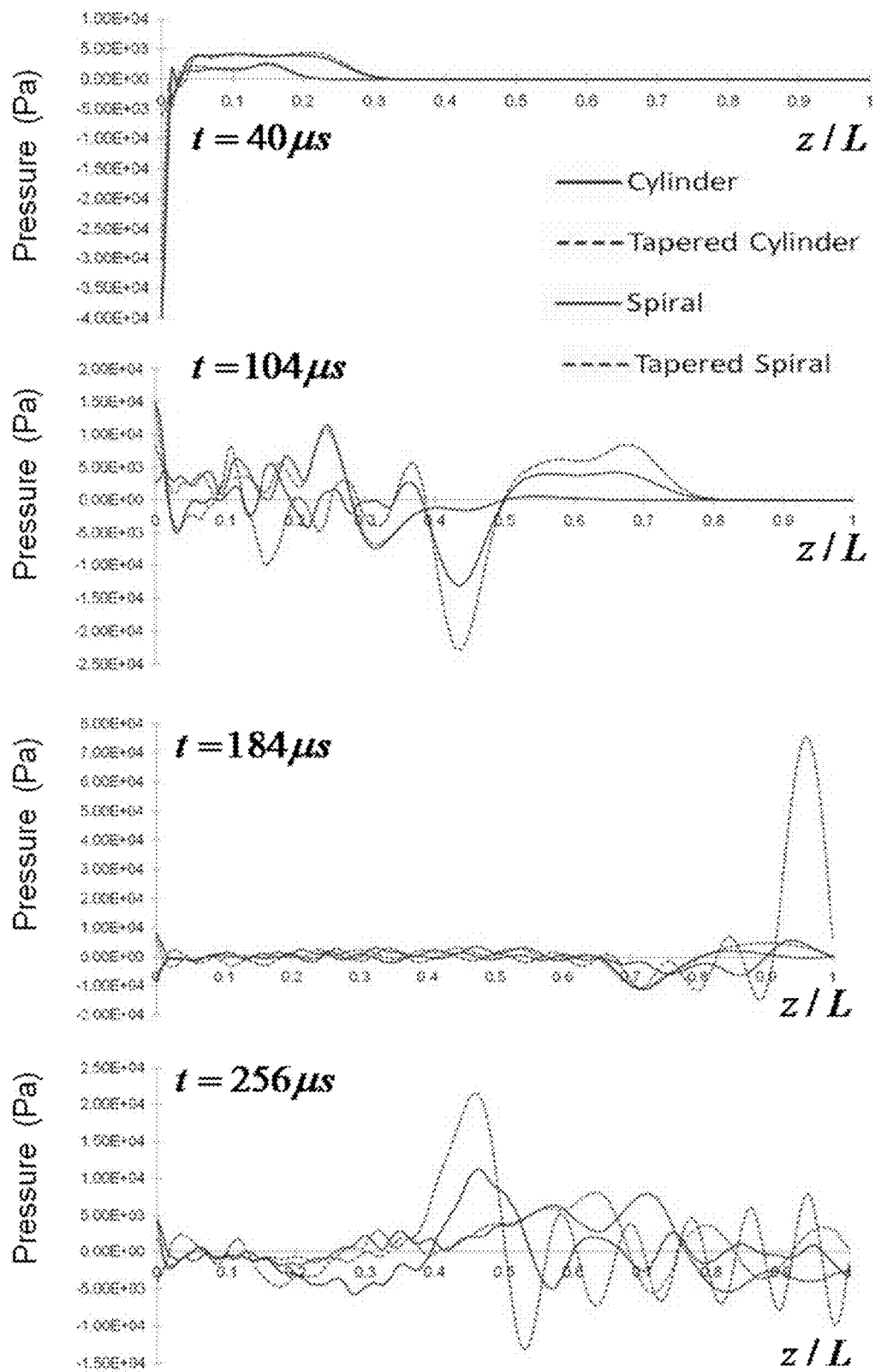
Figure 5:
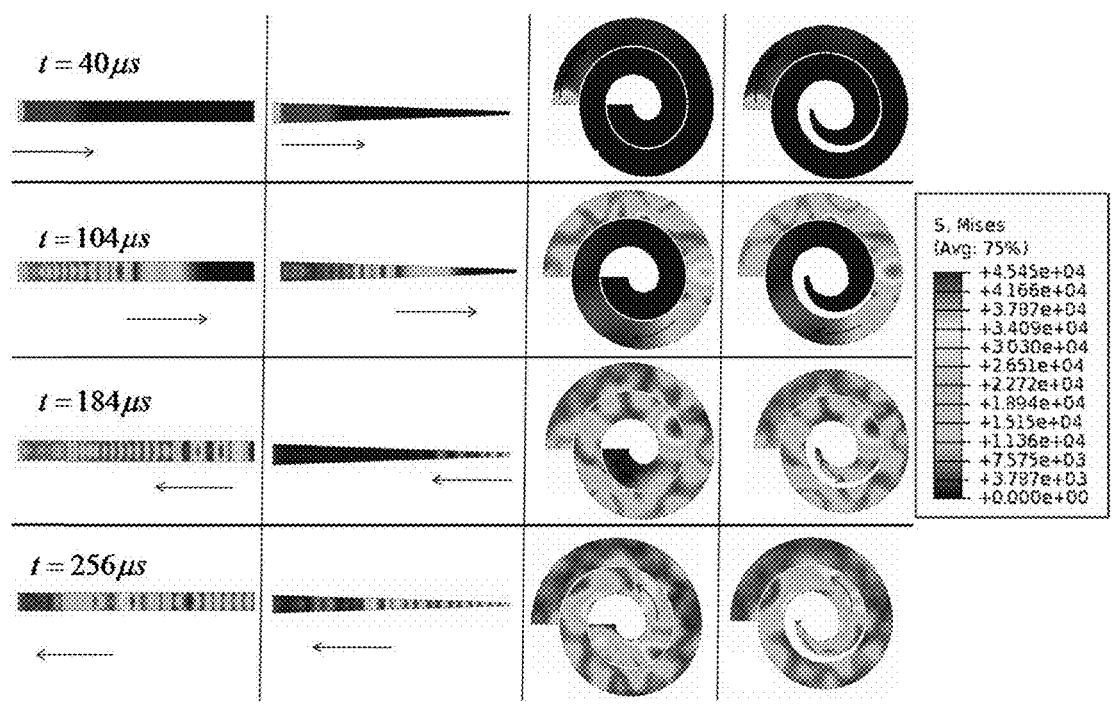
Figure 5B:
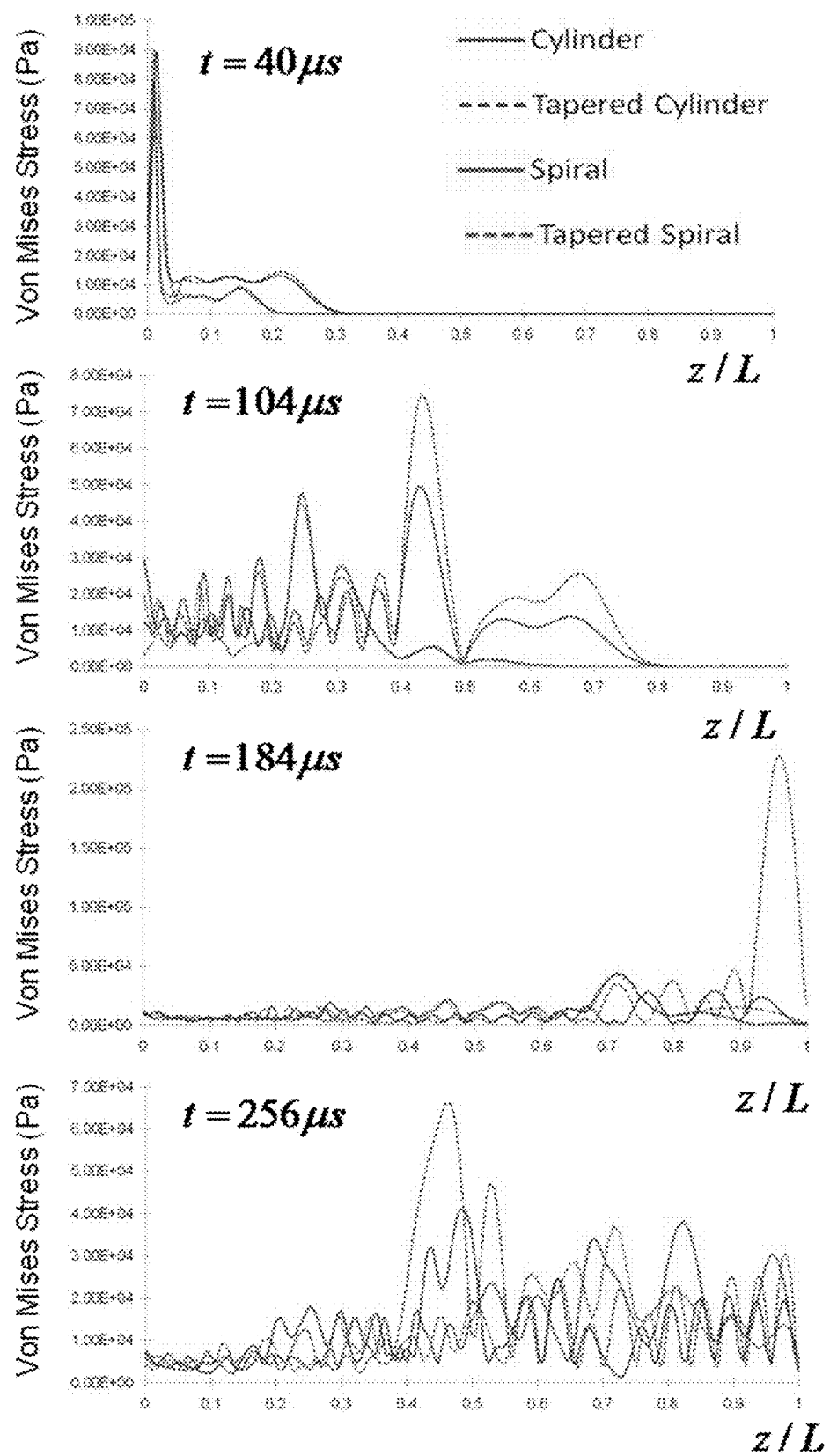

Pressure (or hydrostatic stress), as plotted in FIG. 4, is the stress that tends to change the volume of the body. Compressive stress is taken as positive and tensile stress is negative. The von Mises stress that is used to construct FIG. 5 is the second deviatoric stress invariant, i.e., the von Mises stress is the part of stress tensor that tends to distort the body and is independent of the hydrostatic stress component.

4. Conclusions Based Upon Experimental Data

The spiral shaped element and the embedded wavy material or gap are two useful ways in dissipating energy imposed upon it by an object. The energy is dissipated as a shear wave is induced by vibration of the spiral shaped element and also by the embedded wavy material or gap. Furthermore, the tapered spiral shaped element is better at dissipating impact energy than the spiral shaped element having uniform circular cross section throughout its length. Also, when multiple embedded wavy materials or gaps are introduced within a material, more dissipation occur as well.

The impact can occur from any direction (and any angle), and the spiral shaped element and embedded wavy material or gap will dissipate the impact energy.

The spiral shaped elements and the embedded wavy material or gap can be made out of numerous possible materials. Any material that will enable vibration can be used, including but not limited to, elastic, viscoelastic, and/or plastic.

Shock mitigating materials can be manufactured to include one or more of the spiral shaped elements or structures with embedded wavy materials or gaps. For example, in the case of a football helmet, a helmet layer or football helmet pad insert can be produced with numerous spiral shaped elements in order to dissipate energy when a football player wearing the helmet is impacted and the outer shell can have embedded wavy materials or gaps included in the design.

In the shock mitigating materials, the spiral shaped elements can be situated in or surrounded by air, liquids, gel, elastic, viscoelastic, plastic, or any other material that permits the spiral shaped element to vibrate for the purpose of dissipating impact energy. Furthermore the embedded wavy material can include, air, liquids, gels, viscoelastic, plastic, or any other material that admits the wave to dissipate.

5. Variations, Modifications, and other Embodiments

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

The spiral shaped elements in the shock mitigating material can take many different shapes and sizes, depending upon design and/or manufacturing preferences. Also, the embedded wavy material can also take different wave forms (sinusoid, blocks, triangles, etc.) with different amplitudes and periods.

In some embodiments of shock mitigating materials, each spiral shaped element has a consistently shaped cross section (e.g., circular, polygonal, triangular, square, rectangular, trapezoidal, etc.) throughout its length and is tapered either from a large outside end to a small inside end or from a small outside end to a large inside end. The amplitude and the period of the embedded wavy material may also change within the structure.

In other embodiments of shock mitigating materials, each of the spiral shaped elements is configured in the shape of a helix (or corkscrew). Moreover, the helix in this configuration may be tapered or nontapered. Finally, each element can be in the shape of a conical helix, conical toroid, cylinder helix, or other helix. The embedded wavy material may also have three dimensional helical attributes as well.

In other embodiments of shock mitigating materials, each of the spiral shaped elements reside (are coiled) in a single plane. The elements can be placed side by side in the materials.

In other embodiments of shock mitigating materials, each of the spiral shaped elements is a sheet that is disposed in a rolled configuration so that its cross section along the span of the elongate structure is spiral. The sheet can be tapered or nontapered from an outside end to an inside end. Furthermore, each of the elements can be nonuniform along the elongated span of the rolled configuration, for example, it could be conical.

In other embodiments of shock mitigating materials, there is a mix of different types of spiral shaped elements, as previously mentioned.

At least the following is claimed:

1. A football helmet for use by a player of American football, comprising:
    a manufactured, shock-mitigating, material layer, the material layer comprising one or more spiral shaped elements, each of the spiral shaped elements having a rod that extends in a spiraling manner from a first end to a second end, the rod tapering continuously along its length from the first end to the second end so that the first end exhibits a larger cross sectional area than the second end, the first end being fixed and the second end being unfixed and free, the second end capable of movement and vibration when the helmet is impacted by an object;
    wherein the helmet is sized and shaped for receiving a human head therein;
    wherein the spiral shaped elements are capable of transforming a longitudinal mechanical shock wave into shear waves within the material layer when the football helmet is impacted by the object in order to dissipate impact energy in a direction associated with the shock wave; and
    wherein all of such longitudinal mechanical shock wave is transformed into shear waves.

2. The football helmet of claim 1, wherein the internal cross sectional area of the rod associated with each of the spiral shaped elements is circular.

3. The football helmet of claim 1, wherein the internal cross sectional area of the rod associated with each of the spiral shaped elements is polygonal.

4. The football helmet of claim 1, wherein the rod spirals downwardly from the first end to the second each of the spiral shaped elements forms a helix.

5. The football helmet of claim 1, wherein each of the spiral shaped elements comprises a spiral in a single plane.

6. The football helmet of claim 1, wherein each of the spiral shaped elements comprises a sheet that is disposed in a rolled spiral configuration.

7. The football helmet of claim 1, wherein the spiral shaped elements are situated in or surrounded by a material that permits the spiral shaped elements to vibrate to dissipate the impact energy.

8. A football helmet for use by a player of American football, comprising:
    a manufactured, shock-mitigating, material layer, the material layer comprising a plurality of spiral shaped elements, each of the spiral shaped elements having a rod that extends in a spiraling manner from a first end to a second end, the rod tapering continuously along its length from the first end to the second end so that the first end exhibits a larger cross sectional area than the second end, the first end being fixed and the second end being unfixed and free, the second end capable of movement and vibration when the helmet is impacted by an object;
    wherein the spiral shaped elements are capable of transforming a longitudinal mechanical shock wave into shear waves within the material layer when the football helmet is impacted by the object in order to dissipate impact energy in a direction associated with the shock wave; and
    wherein all of such longitudinal mechanical shock wave is transformed into shear waves.

9. The football helmet of claim 8, wherein the internal cross sectional area of the rod associated with each of the spiral shaped elements is circular.

10. The football helmet of claim 8, wherein the internal cross sectional area of the rod associated with each of the spiral shaped elements is polygonal.

11. The football helmet of claim 8, wherein the rod spirals downward from the first end to the second each so that each of the spiral shaped elements forms a helix.

12. The football helmet of claim 8, wherein each of the spiral shaped elements comprises a spiral in a single plane.

13. The football helmet of claim 8, wherein each of the spiral shaped elements comprises a sheet that is disposed in a rolled spiral configuration.

14. The football helmet of claim 8, wherein the spiral shaped elements are situated in or surrounded by a material that permits the spiral shaped elements to vibrate to dissipate the impact energy.

15. A helmet for use on a human being head for protecting the head against impacts, comprising:
- a manufactured, shock-mitigating, material layer, the material layer comprising one or more spiral shaped elements, each of the spiral shaped elements having a rod that extends in a spiraling manner from a first end to a second end, the rod tapering continuously along its length from the first end to the second end so that the first end exhibits a larger cross sectional area than the second end, the first end being fixed and the second end being unfixed and free, the second end capable of movement and vibration when the helmet is impacted by an object;
- wherein the helmet has a size and shape to enable placement over a human head;
- wherein the spiral shaped elements are capable of transforming a longitudinal mechanical shock wave into shear waves within the material layer when the helmet is impacted by the object in order to dissipate impact energy in a direction associated with the shock wave; and
- wherein all of such longitudinal mechanical shock wave is transformed into shear waves.

16. The helmet of claim 15, wherein the internal cross sectional area of the rod associated with each of the spiral shaped elements is circular.

17. The helmet of claim 15 wherein the internal cross sectional area of the rod associated with each of the spiral shaped elements is polygonal.

18. The helmet of claim 15, wherein the rod spirals downwardly from the first end to the second each so that each of the spiral shaped elements forms a helix.

19. The helmet of claim 15, wherein each of the spiral shaped elements comprises a spiral in a single plane.

20. The helmet of claim 15, wherein each of the spiral shaped elements comprises a sheet that is disposed in a rolled spiral configuration.

21. The helmet of claim 15, wherein the spiral shaped elements are situated in or surrounded by a material that permits the spiral shaped elements to vibrate to dissipate the impact energy.

22. The helmet of claim 15, wherein the rod spirals consistently throughout its length from the first end to the second each so that each of the spiral shaped elements forms a cylindrical configuration.

* * * * *